(12) United States Patent
Putti

(10) Patent No.: US 12,541,220 B2
(45) Date of Patent: Feb. 3, 2026

(54) INDEPENDENT CLOCKING FOR CONFIGURATION AND STATUS REGISTERS

(71) Applicant: Google LLC, Mountain View, CA (US)

(72) Inventor: Nagaraj Ashok Putti, Karnataka (IN)

(73) Assignee: Google LLC, Mountain View, CA (US)

( * ) Notice: Subject to any disclaimer, the term of this patent is extended or adjusted under 35 U.S.C. 154(b) by 76 days.

(21) Appl. No.: 18/571,078

(22) PCT Filed: Jun. 22, 2021

(86) PCT No.: PCT/US2021/038378
§ 371 (c)(1),
(2) Date: Dec. 15, 2023

(87) PCT Pub. No.: WO2022/271154
PCT Pub. Date: Dec. 29, 2022

(65) Prior Publication Data
US 2024/0281021 A1 Aug. 22, 2024

(51) Int. Cl.
*G06F 1/08* (2006.01)
*G06F 1/10* (2006.01)
*G06F 13/40* (2006.01)

(52) U.S. Cl.
CPC .......... *G06F 1/08* (2013.01); *G06F 1/10* (2013.01); *G06F 13/405* (2013.01)

(58) Field of Classification Search
CPC ..... G06F 1/04; G06F 1/08; G06F 1/12; G06F 1/10; G06F 13/405
See application file for complete search history.

(56) References Cited

U.S. PATENT DOCUMENTS

| 6,636,074 B2 | 10/2003 | Schulz |
| 6,675,305 B1 | 1/2004 | Mohammad |
| 7,243,250 B2 | 7/2007 | Ueda |

(Continued)

FOREIGN PATENT DOCUMENTS

WO 2022271554 12/2022

OTHER PUBLICATIONS

"International Search Report and Written Opinion", Application No. PCT/US2021/038378, Mar. 9, 2022, 11 pages.

(Continued)

*Primary Examiner* — Raymond N Phan
(74) *Attorney, Agent, or Firm* — Colby Nipper PLLC

(57) ABSTRACT

This document describes systems and techniques that enable independent clocking for configuration and status registers (CSRs). The described systems and techniques can provide a clock signal to a CSR set of an IP block with a derived clock rate an integer division slower than a clock rate of another clock signal that enables operation of the IP block, which may include communication between the IP block and an application processor. The derived clock rate is synchronous to but independent of the clock rate of the clock signal. In this way, the application processor and other entities can access the CSR set independent of clocking of the IP block. For example, the application processor can read from or write to the CSR set without waking the IP block from an Auto Clock Gated mode. By so doing, described aspects of independent clocking can reduce power dissipation associated with the CSR set.

20 Claims, 9 Drawing Sheets

(56) References Cited

U.S. PATENT DOCUMENTS

| | | | |
|---|---|---|---|
| 8,339,869 | B2 | 12/2012 | Hotta et al. |
| 9,218,018 | B2 | 12/2015 | Vahidsafa et al. |
| 9,465,432 | B2 * | 10/2016 | Henry ................. G06F 12/0891 |
| 9,658,852 | B2 | 5/2017 | Koehler et al. |
| 9,665,160 | B1 | 5/2017 | Cao et al. |
| 2003/0018924 | A1 | 1/2003 | Mohammad |
| 2003/0141901 | A1 * | 7/2003 | Schulz ................. G06F 1/3203 |
| | | | 326/93 |
| 2006/0282251 | A1 | 12/2006 | Schuppe |
| 2013/0055004 | A1 * | 2/2013 | Koniaris ................. G06F 1/10 |
| | | | 713/501 |
| 2013/0246985 | A1 | 9/2013 | Ly et al. |
| 2014/0082396 | A1 | 3/2014 | Vahidsafa et al. |
| 2025/0306100 | A1 | 10/2025 | Majumder et al. |

OTHER PUBLICATIONS

"International Preliminary Report on Patentability", Application No. PCT/US2021/038378, Dec. 14, 2023, 8 pages.

Kumar, et al., "Pragmatic Formal Verification Methodology for Clock Domain Crossing (CDC)", Apr. 20, 2024, 11 pages.

Plassan, Guillaume, "Conclusive Formal Verification of Clock Domain Crossing Properties", Mar. 2018, 110 pages.

* cited by examiner ical property (IP) blocks. The IP blocks generally include a set of configuration and status registers (CSRs). CSRs are also sometimes known as control and status registers. A CSR is generally an entity (e.g., a flop) that a processor, hardware entity, or software entity can read or write at a specific address and bit position(s). For example, the CSRs can provide control knobs and status updates associated with the IP blocks. The CSRs can also configure the IP blocks to perform in a specific manner.

INDEPENDENT CLOCKING FOR CONFIGURATION AND STATUS REGISTERS

RELATED APPLICATION(S)

This application is a national stage entry of International Application No. PCT/US2021/038378, filed Jun. 22, 2021, the disclosure of which is incorporated herein by reference in its entirety.

BACKGROUND

Application-specific integrated circuits (ASICs), systems-on-chips (SoCs), and other integrated circuits (ICs) often include one or more intellectual property (IP) blocks. The IP blocks generally include a set of configuration and status registers (CSRs). CSRs are also sometimes known as control and status registers. A CSR is generally an entity (e.g., a flop) that a processor, hardware entity, or software entity can read or write at a specific address and bit position(s). For example, the CSRs can provide control knobs and status updates associated with the IP blocks. The CSRs can also configure the IP blocks to perform in a specific manner.

Many IC layout designs route common clock lines to both the IP block and the CSRs, such that the CSRs operate at the same clock speed as the IP blocks. This results in higher power dissipation, additional latency in accessing the CSRs, more constraints on the physical placement of retention power rails, and the inability of software to update the CSRs without also powering up the IP blocks. Other layout designs run the CSRs of an IP block on a slower dedicated clock with custom clock domain crossing (CDC) synchronizers. However, these custom CDC synchronizers can require significant design effort, incur a significant design area penalty, and increase power consumption.

SUMMARY

This document describes systems and techniques that enable independent clocking for CSRs. The described systems and techniques can provide a clock signal to a CSR set of an IP block with a derived clock rate that is an integer division slower than a clock rate of another clock signal that enables operations of the IP block, which may include communication between the IP block and an application processor. The derived clock rate is synchronous to but independent of the clock rate. In this way, the application processor and other entities can access the CSR set independent of clocking of the IP block. For example, the application processor can read from or write to the CSR set without waking the IP block from an Auto Clock Gated (ACG) mode. The described aspects of independent clocking may also be implemented with a minimal increase in IC design area (e.g., less complexity) and reduce the power dissipation associated with the CSR set.

In aspects, an integrated circuit (IC) includes an IP block, an asynchronous bridge, and a clock manager. The IP block includes at least one IP subsystem and a CSR set associated with the at least one IP subsystem. The asynchronous bridge operatively couples the CSR set of the IP block to an application processor associated with the IC. The clock manager is operatively coupled to the asynchronous bridge, the IP block, and the CSR set together. The clock manager can generate a first clock signal and provide it to the IP block to enable communication between the IP subsystems and the application processor. The clock manager can also generate a second clock signal. The second clock signal has a derived clock rate that is an integer division slower than the clock rate of the first clock signal. The second clock signal can be selectively gated independent of the first clock signal. The clock manager can also provide the second clock signal to the CSR set and the asynchronous bridge to enable communication between the application processor and the CSR set at the derived clock rate.

This document also describes other methods, configurations, and systems that enable independent clocking for CSRs.

This Summary introduces simplified concepts for an independent clocking for CSRs, which is further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of an independent clocking for CSRs are described in this document with reference to the following drawings. The same numbers are used throughout multiple drawings to reference like features and components.

DETAILED DESCRIPTION

Overview

Figure 1:
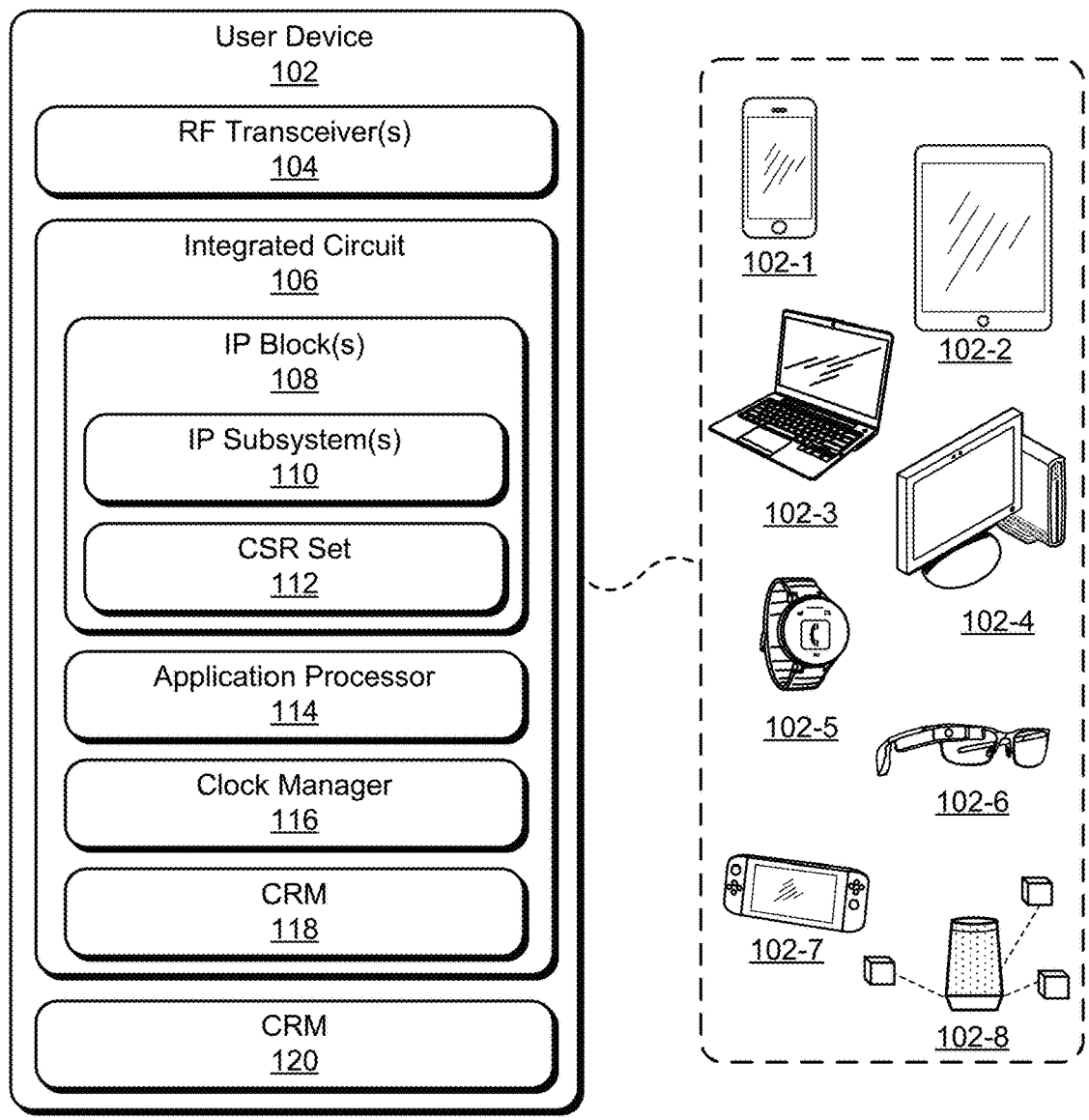
FIG. 1 illustrates an example device diagram of a user device in which aspects of independent clocking for CSRs can be implemented.

This document describes aspects of independent clocking for CSRs. In various aspects, IP blocks of an SoC can include IP subsystems with an associated CSR set. The IP blocks can be spread across the SoC and located within different power domains or clock domains. The IP blocks generally support a configuration access port or channel that is accessible by an application processor or host of the SoC. The described aspects provide a configuration access channel that generally runs at a different clock rate than the clock rate of the IP block (e.g., core of the IP block). This document describes embodiments and examples in the context of an SoC that includes IP blocks and IP subsystems for convenience. The principles of this document may be applied generally to functional blocks, IP blocks, or subsystems of an SoC or IC that include CSRs and to enable operation of the CSR set on a different and independent clock domain than the blocks and subsystems.

As described above, the CSR set can provide control elements and status updates associated with the IP blocks and IP subsystems. The CSR set can configure the hardware of the IP blocks to perform in a specified manner. The application processor or software routines can also use the CSRs to read the current status of events occurring in the IP subsystems and IP blocks. A particular CSR set can include several attributes, including control only (e.g., read and write operations available for the application processor and read-only operations available for the IP subsystems), monitoring only (e.g., read-only operations available for the application processor. and read and write operations available for the IP subsystems), or a combination of both.

The clocking and placement of CSRs usually involve consideration of several issues. For example, engineers may consider the power dissipation from the CSRs, circuit-routing ease, and whether to retain CSR values during a power-down of the IP block. Design engineers may also consider whether the IP block should be powered up from an ACG mode before the application processor can read or write to the CSRs of the IP block. The ACG feature can gate the core clock at the root level to save clock routing and power when the IP block is inactive (e.g. powered down or placed in a low-power sleep state). In addition, design engineers may consider the generation of Register Transfer Level (RTL) code for the CSR design.

The described systems and techniques enable independent clocking for CSRs that uses a derived clock rate that is synchronous to and an integer division slower than the clock rate of the core clock signal. The described independent clocking aspects allow an application processor to read from and write to the CSRs seamlessly. Because a clock manager or a clock gate controller can selectively gate the derived clock signal independent of the core clock signal. the application processor can access the CSR set even when the IP block is in ACG mode. Aspects of the described independent clocking also allows engineers to place the CSR set near the retention power rail without negatively impacting chip timing.

As a non-limiting example, an SoC or integrated circuit includes an IP block, an asynchronous bridge, and a clock manager. The IP block includes at least one IP subsystem and a CSR set associated with the IP subsystems. The asynchronous bridge operatively couples the CSR set to an application processor. The clock manager operatively couples the asynchronous bridge, the IP block, and the CSR set together. The clock manager can generate a first clock signal and provide it to the IP block to enable communication between the IP subsystems and the application processor. The clock manager can also generate a second clock signal. The second clock signal has a derived clock rate that is an integer division slower than the clock rate of the first clock signal. The second clock signal can be selectively gated independent of the first clock signal. The clock manager can also provide the second clock signal to the CSR set and the asynchronous bridge to enable communication between the application processor and the CSR set at the derived clock rate.

This example is just one illustration of independent clocking for CSRs to improve the clocking and placement of CSRs in SoCs. Other example configurations and methods are described throughout this document. This document now describes additional example methods, configurations, and components for the described independent clocking for CSRs.

Example Devices

FIG. 1 illustrates an example device diagram 100 of a user device 102 in which aspects of independent clocking for CSRs can be implemented. The user device 102 may include additional components and interfaces omitted from FIG. 1 for the sake of clarity.

The user device 102 can be implemented as a variety of consumer electronic devices. As non-limiting examples, the user device 102 can be a mobile phone 102-1, a tablet device 102-2, a laptop computer 102-3, a desktop computer 102-4, a computerized watch 102-5, a wearable computer 102-6, a video game console 102-7, or a voice-assistant system 102-8.

The user device 102 can include one or more radio frequency (RF) transceivers 104 for communicating over wireless networks. The user device 102 can tune the RF transceivers 104 and supporting circuitry (e.g., antennas, front-end modules, amplifiers) to one or more frequency bands defined by various communication standards.

The user device 102 also includes the integrated circuit 106. The integrated circuit 106 can include, as non-limiting examples, an SoC, a central processing unit, a graphics processing unit, an ASIC, a field-programmable gate array (FPGA), a media controller, a memory controller, a tensor processing unit, or any other hardware circuit that supports a configuration access channel. The integrated circuit 106 generally integrates several components of the user device 102 into a single chip, including a central processing unit, memory, and input and output ports. The integrated circuit 106 can include a single core or multiple cores. In the depicted implementation, the integrated circuit 106 includes one or more IP blocks 108, an application processor 114, a clock manager 116, and computer-readable storage media (CRM) 118. The integrated circuit 106 can include other components, including communication units (e.g., modems), input/output controllers, and system interfaces.

Each IP block 108 includes one or more IP subsystems 110 and a CSR set 112. The IP blocks 108 represent a collection of the IP subsystems 110 within a particular power domain or clock domain of the integrated circuit 106. The IP blocks 108 can be implemented as another processor, engine, or co-processor of the integrated circuit 106 that enables certain functionalities of the user device 102. This document identifies and describes various example IP blocks 108 with respect to FIG. 9. The CSR set 112 includes a collection of CSRs that each provides information to hardware or software of the IC 106 about the status of events and configuration values associated with the IP block 108 or the IP subsystems 110. The CSR set 112 can be saved and restored across a power-cycle event for the corresponding IP block 108 or power domain.

The application processor 114 can include a combined processor and memory system that executes computer-executable instructions stored on computer-readable storage media (e.g., CRM 118 or CRM 120) to control the operation of the integrated circuit 106 and enable functionalities of the user device 102. Generally, the application processor 114 may be implemented at least partially in hardware. For example, the application processor 114 can execute firmware, an operating system, or other computer-executable instructions to read from or write to the CSR set 112 associated with an IP subsystem 110 of a particular IP block 108.

The clock manager 116 can generate one or more derived clock signals (e.g., a derived core clock signal or a second clock signal) with a derived clock rate that is synchronous to the clock rate of a core clock signal (e.g., a first clock signal).

In some implementations, the derived clock rate is an integer division slower (e.g., two, three, four, five, or six) than the clock rate of the core clock signal. In other implementations, the derived clock rate is an integer multiplication faster (e.g., two, three, four, five, or six) than the clock rate of the core clock signal. The core clock signal enables the communication between the IP subsystems 110 and the application processor 114. The derived clock signal enables the communications between the application processor 114 and the CSR set 112 at the derived clock rate. The described independent clocking can selectively gate the derived clock signal independent of the core clock signal (and vice versa), enabling software updates (e.g., write operations) and readouts (e.g., read operations) to occur seamlessly and without additional latencies. The clock manager 116 can be implemented with or include hardware, firmware, software, or a combination thereof. The clock manager 116 is operably coupled to the IP blocks 108 and the CSR set 112.

The CRM 118 is a suitable storage device (e.g., static random access memory (SRAM), dynamic RAM (DRAM), non-volatile RAM (NVRAM), synchronous dynamic RAM (SDRAM)) to store data accessible by the application processor 114 and/or IP blocks 108. The CRM 118 enables persistent or non-transitory data storage of system data, which can include firmware, an operating system, applications, and any other types of information or data related to operational aspects of the integrated circuit 106. In other implementations, the CRM 118 can be located outside the integrated circuit 106.

The user device 102 also includes computer-readable storage media (CRM) 120. The CRM 120 is a suitable storage device (e.g., random-access memory (RAM), static RAM (SRAM), dynamic RAM (DRAM), non-volatile RAM (NVRAM), read-only memory (ROM), Flash memory) to store device data of the user device 102. The device data can include an operating system, one or more applications, user data, and multimedia data. In other implementations, the CRM 120 can store the operating system and a subset of the applications. user data, and multimedia data of the integrated circuit 106. The operating system generally manages hardware and software resources of the user device 102 and provides common services The operating system and the applications are generally executable by the integrated circuit 106 to enable communications and user interaction with the user device 102, which may require accessing data in the CRM 118 or the CRM 120.

Figure 2:
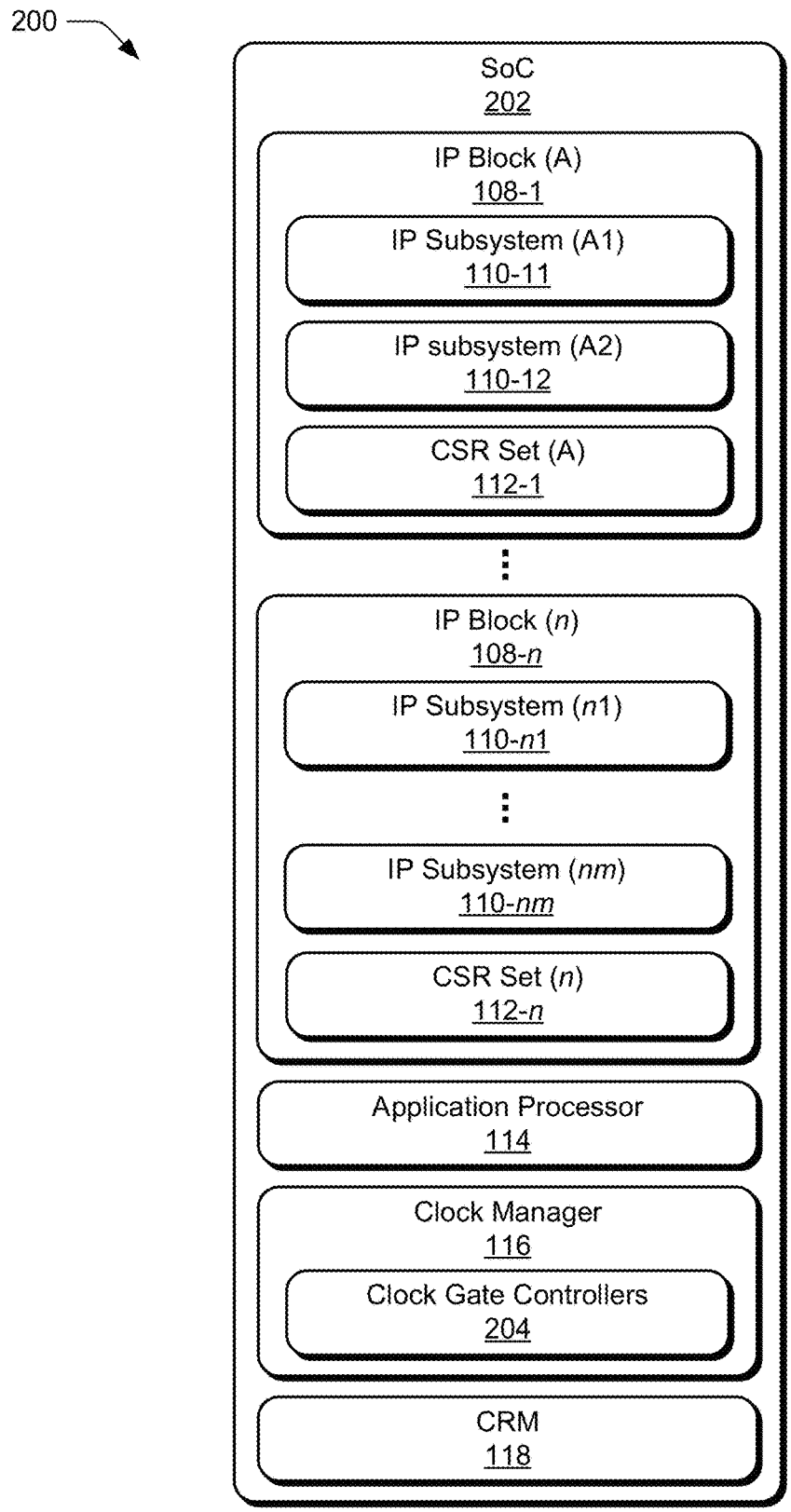
FIG. 2 illustrates an example device diagram of an SoC in which aspects of independent clocking for CSRs can be implemented.

FIG. 2 illustrates an example device diagram 200 of an SoC 202 in which aspects of independent clocking for CSRs can be implemented. In this example, the SoC 202 includes similar components to those shown in the integrated circuit 106 of FIG. 1, with some additional detail. The SoC 202 can include additional components, which are not illustrated in FIG. 2.

The SoC 202 includes multiple IP blocks 108, the application processor 114, the clock manager 116, and the CRM 118. The IP blocks 108 include an IP block (A) 108-1 and one or more additional IP blocks, including an IP block (n) 108-n, where n represents a positive integer greater than one.

Each of the IP blocks 108 includes one or more IP subsystems 110 and a CSR set 112. In this example, the IP block (A) 108-1 includes IP subsystem (A1) 110-11 and IP subsystem (A2) 110-12 operably connected to a CSR set (A) 112-1. The IP block (n) 108-n includes IP subsystem (n1) 110-n1 and IP subsystem (nm) 110-nm operably connected to a CSR set (n) 112-n, where m represents a positive integer greater than one.

The CSR sets 112 store configuration and registration values of or associated with the IP subsystems 110. The CSR sets 112 are generally always on and sufficiently numerous to store configuration and registration values of the IP subsystems 110 of the SoC 202.

The clock manager 116 includes one or more clock gate controllers 204. The clock manager 116 is operatively coupled to the IP blocks 108 and the CSR sets 112. The clock gate controllers 204 can "gate" or turn off a clock signal (e.g., a first clock signal or a second clock signal) for a particular IP block 108 when the clock signal is not needed to save dynamic power. For example, one of the clock gate controllers 204 can selectively gate the core clock signal provided to the IP blocks 108 independent of the derived clock signal. The core clock signal enables operation of the IP block and subsystems thereof, such as the communication between the at least one IP subsystems 110 (e.g., the IP subsystem A1 110-11) and the application processor 114

Similarly, one or more other clock gate controllers 204 can selectively gate the derived clock signal provided to the CSR set 112 independent of the core clock signal. The derived clock signal enables communication between the application processor 114 and the CSR set 112 at the derived clock rate. The clock gate controllers 204 can include hardware, firmware. software, or a combination thereof. The clock gate controllers 204 can be included as a part of the clock manager 116 or separate from the clock manager 116.

Figure 8:
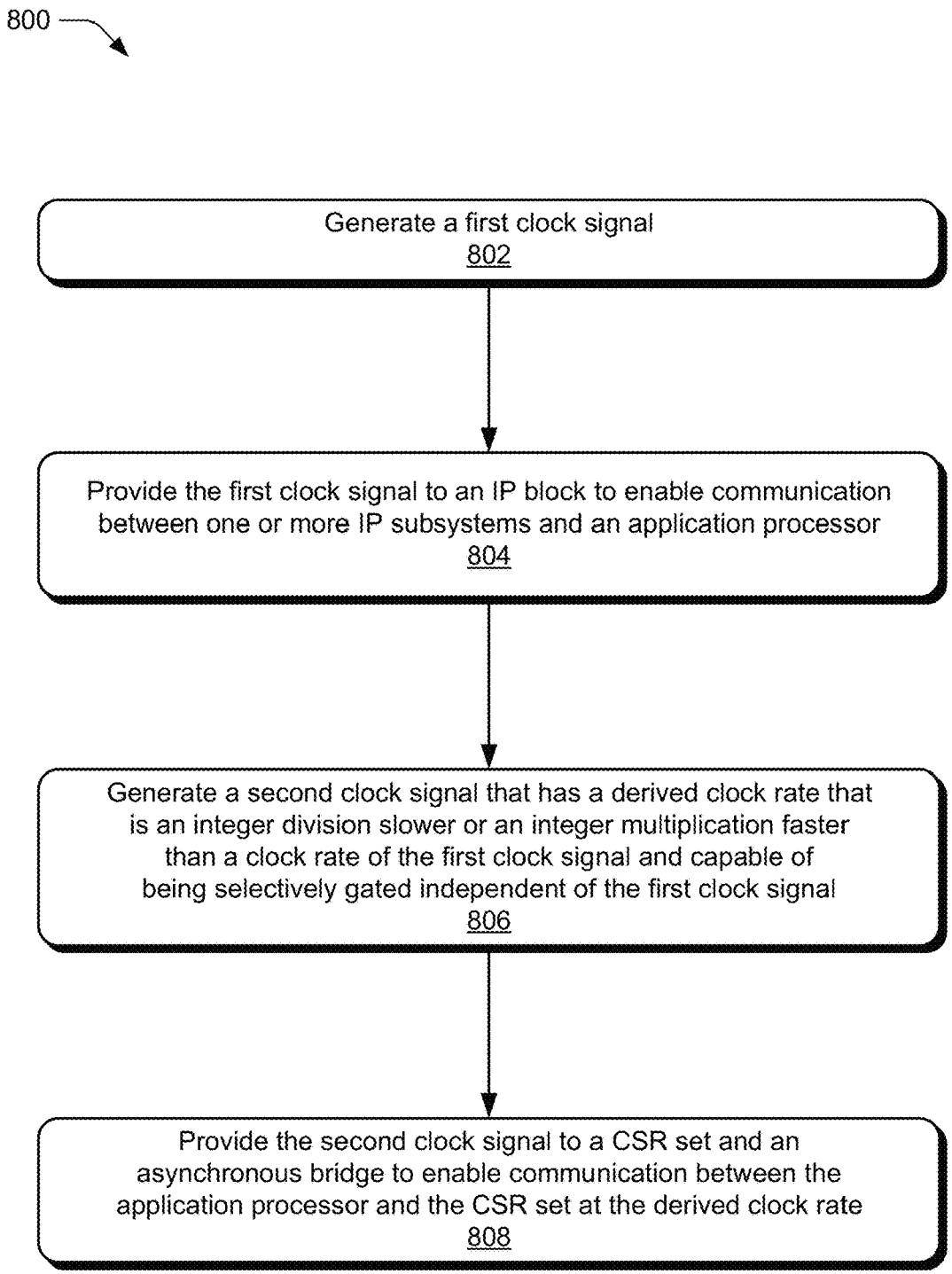
FIG. 8 is a flowchart illustrating example operations of independent clocking for CSRs.
Figure 9:
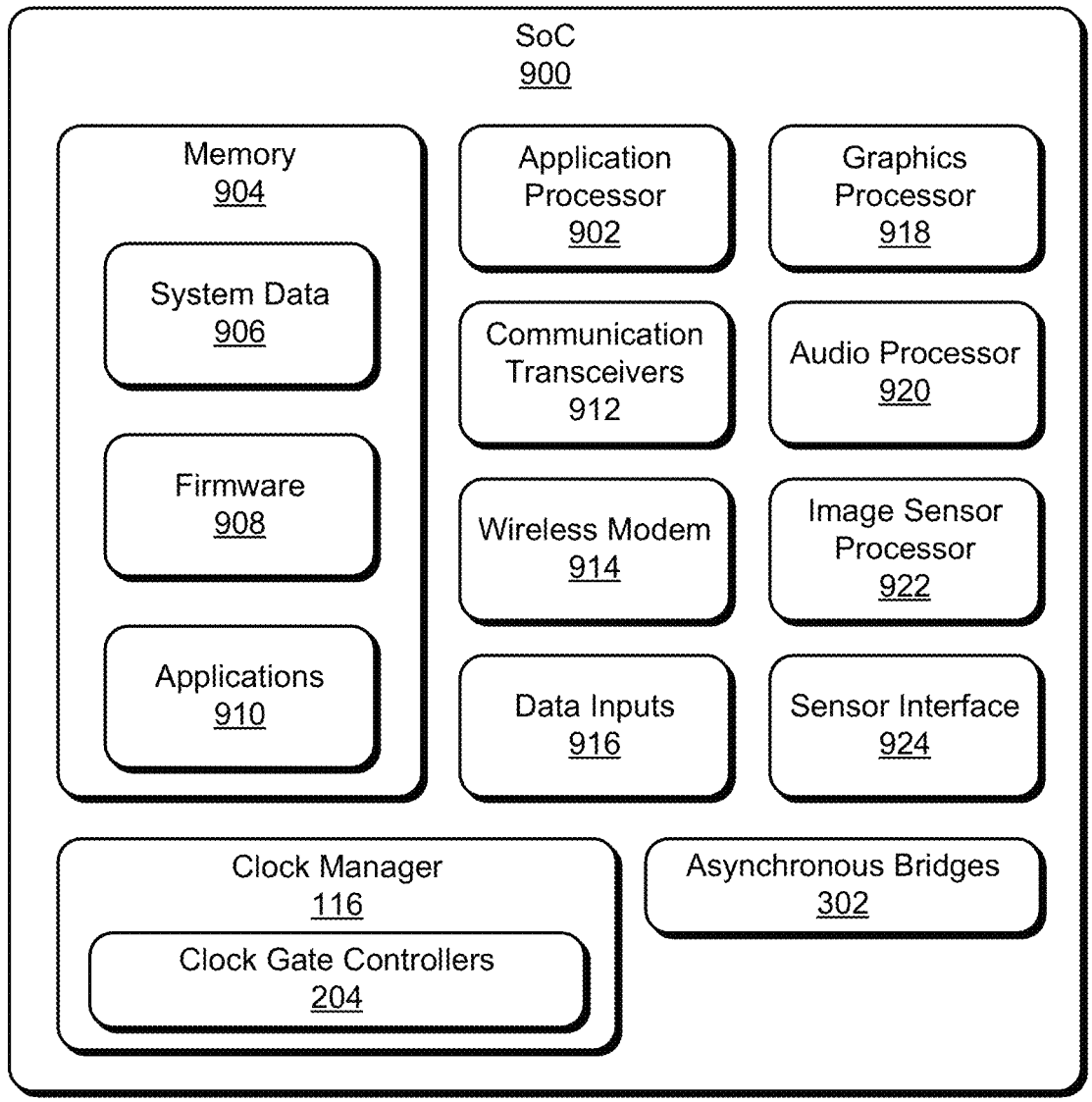
FIG. 9 illustrates an example SoC that may implement aspects of independent clocking for CSRs.

This document describes the arrangement and operation of the independent clocking for the CSR set 112, specifically the arrangement and operation of the IP block 108, IP subsystems 110, the CSR set 112, the application processor 114, the clock manager 116, and the clock gate controllers 204, in greater detail with respect to FIGS. 3 through 7 and/or the SoC of FIG. 9. This document also describes an example method performed by aspects of the independent clocking for the CSR set 112 in greater detail with respect to FIG. 8.

Example Configurations

This section illustrates example configurations of independent clocking for CSRs, which may occur separately or together in whole or in part. This section describes the example configurations in relation to drawings for ease of reading.

Figure 3:
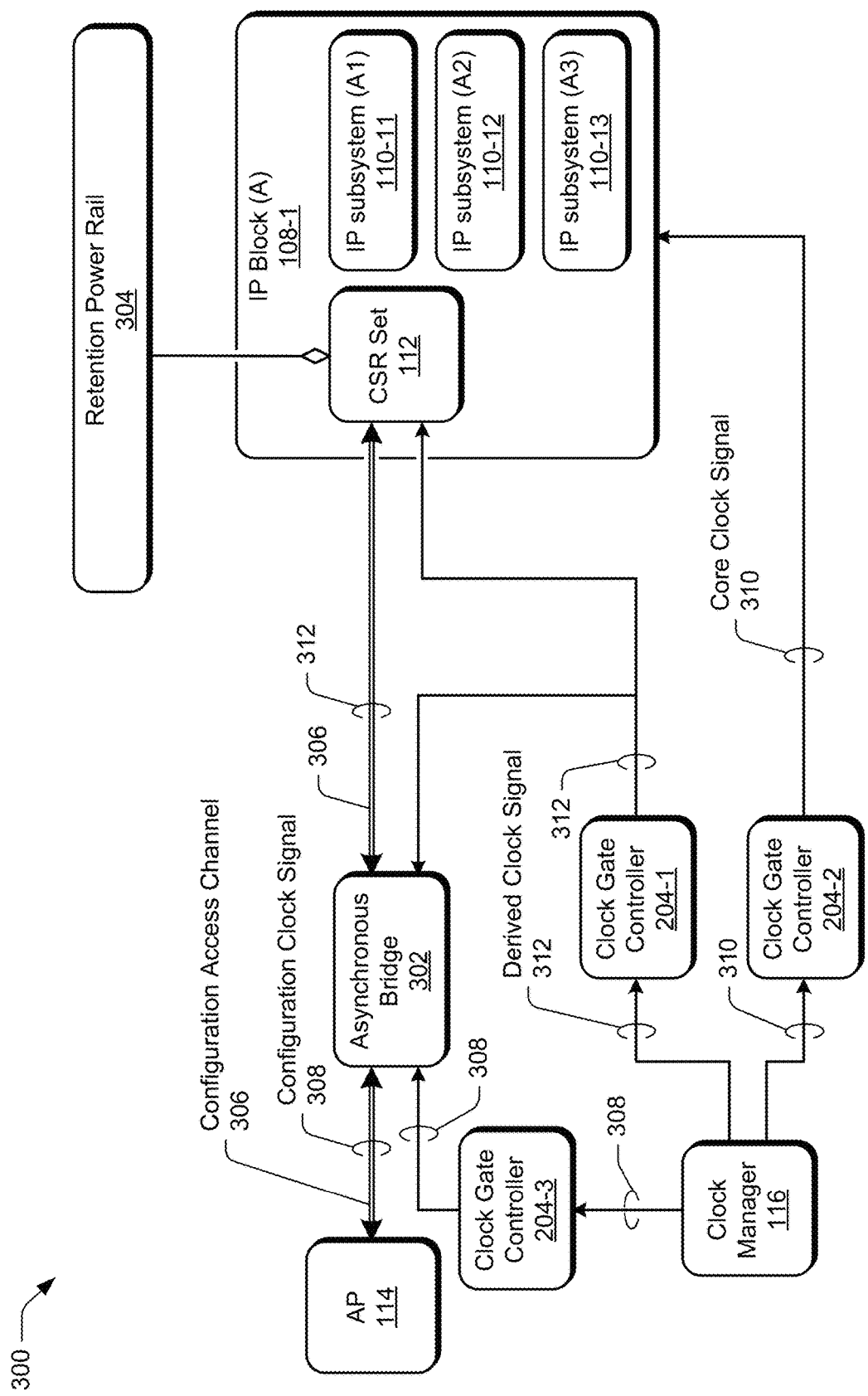
FIG. 3 illustrates an example diagram of independent clocking for CSRs.

FIG. 3 illustrates an example diagram 300 of independent clocking for CSRs. Aspects of the independent clocking can be implemented in the SoC 202 and include additional components, which are not illustrated in FIG. 3. The diagram 300 illustrates a configuration for providing a derived clock signal 312 that is synchronous to, but has a derived clock rate that is an integer division slower or an integer multiplication faster than a clock rate of a core clock signal 310. Generally, the aspects described herein enable independent clocking of the IP block and CSRs with separate clocks that operate at different frequencies and/or gating to facilitate independent operation or access to the IP subsystem or the CSRs. By so doing, an application processor or host of an SoC may access the CSRs or IP subsystem while the other entity is clocked at a slower frequency or inactive, thereby reducing power consumed by the IP block, IP subsystems, or CSR circuits.

Any coupling or connection between various components may be direct or indirect, such as made through one or more intervening components. For visual brevity and/or clarity, some unrelated or redundant components (e.g., logic gates or complementary data paths), couplings (e.g., connections, traces, wires, interconnects), or circuitry may also be omitted from this or other circuit diagrams. Such an omission is not to be construed as limiting, but rather one example of the many ways in which various aspects of the described circuitry may be used or applied to implement aspects of independent clocking for CSRs. In other words, the aspects (e.g. circuitry and/or modules) described herein may also be implemented with any suitable number or combination of logic gates, data paths, and/or additional or separate redundant or replicated cells.

Similar to FIG. 2, the SoC 202 includes the IP block (A) 108-1 with the IP subsystem (A1) 110-11, the IP subsystem (A2) 110-12, and the IP subsystem (A3) 110-13, and the CSR set 112. The SoC 202 can also include the application processor 114, an asynchronous bridge 302, a retention power rail 304, the clock manager 116, and multiple clock gate controllers 204 (e.g., a clock gate controller 204-1, clock gate controller 204-2, and clock gate controller 204-3).

The asynchronous bridge 302 enables communication (e.g., data transmission) between different clock domains. For example, the asynchronous bridge 302 can enable buffered synchronization of communications between the different clock domains associated with the core clock signal 310, the derived clock signal 312, and a configuration clock signal 308. In the depicted implementation, the application processor 114 can utilize a configuration access channel 306 to read or write a configuration value to the CSR set 112. The configuration access channel 306 can operate on a configuration clock signal 308, which can have a clock rate the same as or different than the core clock signal 310 or the derived clock signal 312. The application processor 114 operatively couples to the asynchronous bridge 302 via the configuration access channel 306. The asynchronous bridge 302 is operatively coupled to the CSR set 112 via the configuration access channel 306.

In aspects, the IP block (A) 108-1 is operably connected to the retention power rail 304. The retention power rail 304 provides power to the registers (e.g., flops) within the CSR set 112. The described independent clocking allows the retention power rail 304 to operatively couple to the CSR set 112 that can operate at a slower clock rate than the core clock signal 310. This design may also enable the CSR set 112 to be placed near the retention power rail 304 without negatively impacting the timing of the SoC 202.

The clock manager 116 can generate the core clock signal 310 and the derived clock signal 312. The clock manager 116 is operatively coupled to the asynchronous bridge 302, the IP block (A) 108-1, and the CSR set 112. The clock manager 116 is also operatively coupled to the clock gate controller 204-1, the clock gate controller 204-2, and the clock gate controller 204-3. In aspects, the clock manager 116 provides the core clock signal 310 to the IP block (A) 108-1 to enable operation of the IP block, which may include communication between the IP subsystems 110 and the application processor 114. The clock manager can also provide the derived clock signal 312 to the CSR set 112 and the asynchronous bridge 302 to enable communications between the application processor 114 and the CSR set 112 at a derived clock rate.

The derived clock signal 312 has the derived clock rate that is an integer division slower or an integer multiplication faster than the core clock signal 310. The clock manager 116 can dynamically adjust the derived clock rate to different integer divisions or different integer multiplications of the clock rate of the core clock signal 310. For example, the different integer divisions of the derived clock rate can be equal to two, three, four, five, six, or another integer. The different integer multiplications of the derived clock rate can be equal to two, three, four, five. six, or another integer. In this way, the derived clock signal 312 can operate at a slower or faster rate than the core clock signal 310. As described above, the derived clock signal 312 is an integer division slower (e.g., two, four, or six times slower) than the core clock signal 310. The clock manager 116 can also ensure that the derived clock signal 312 is synchronous to the core clock signal 310.

One or more circuit paths that terminate at the CSR set 112 can be configured as multi-cycle paths. The derived clock rate scales along with the clock rate of the core clock signal 310 to support various dynamic voltage and frequency scaling (DVFS) frequency values. As such, aspects of the independent clocking enables clock adjustment for any potential integer division value or potential integer multiplication value without a loss of the phase relationship between the core clock signal 310 and the derived clock signal 312. In this way, aspects of the described independent clocking provide synchronous clocking and avoids violation of the multi-cycle path phasing for the SoC 202.

The derived clock signal 312 can be selectively gated independent of the core clock signal 310 and the core clock signal 310 can be selectively gated independent of the derived clock signal 312. In this way, a performance point of the derived clock signal 312 is independent of a performance point of the core clock signal 310. For example, the clock gate controller 204-1 is operatively coupled between the clock manager 116 and the CSR set 112 and can selectively gate the derived clock signal 312 independent of whether the core clock signal 310 is gated. In this way, the application processor 114 can write a configuration value to the CSR set 112 at the derived clock rate when the core clock signal 310 is gated (e.g., during enabling of an ACG mode for the IP block (A) 108-1). Similarly, the clock gate controller 204-2 is operatively coupled between the clock manager 116 and the IP subsystems 110 and can selectively gate the core clock signal 310 independent of whether the derived clock signal 312 is gated. The clock gate controller 204-2 can, for example, gate the core clock signal 310 to enable an ACG mode for the IP block (A) 108-1 or the IP subsystems 110. The clock gate controller 204-3 may be operatively coupled between the clock manager 116 and the asynchronous bridge 302 and can selectively gate the configuration clock signal 308.

In the depicted implementation, the SoC 202 includes a single IP block 108, a single asynchronous bridge 302, and a single clock manager 116. In other implementations, the SoC 202 can include multiple IP blocks 108. Each of the multiple IP blocks 108 can include respective IP subsystems 110 and a respective CSR set 112 associated with the IP subsystem 110. The SoC 202 can also include multiple respective asynchronous bridges 302. Each of the multiple asynchronous bridges 302 is operatively coupled between the application processor 114 and the respective CSR sets 112 of the multiple IP blocks 108. The SoC 202 can also include multiple respective clock managers 116, each of which is operatively coupled to the respective asynchronous bridge 302, the respective IP block 108, and the respective CSR set 112.

Figure 4:
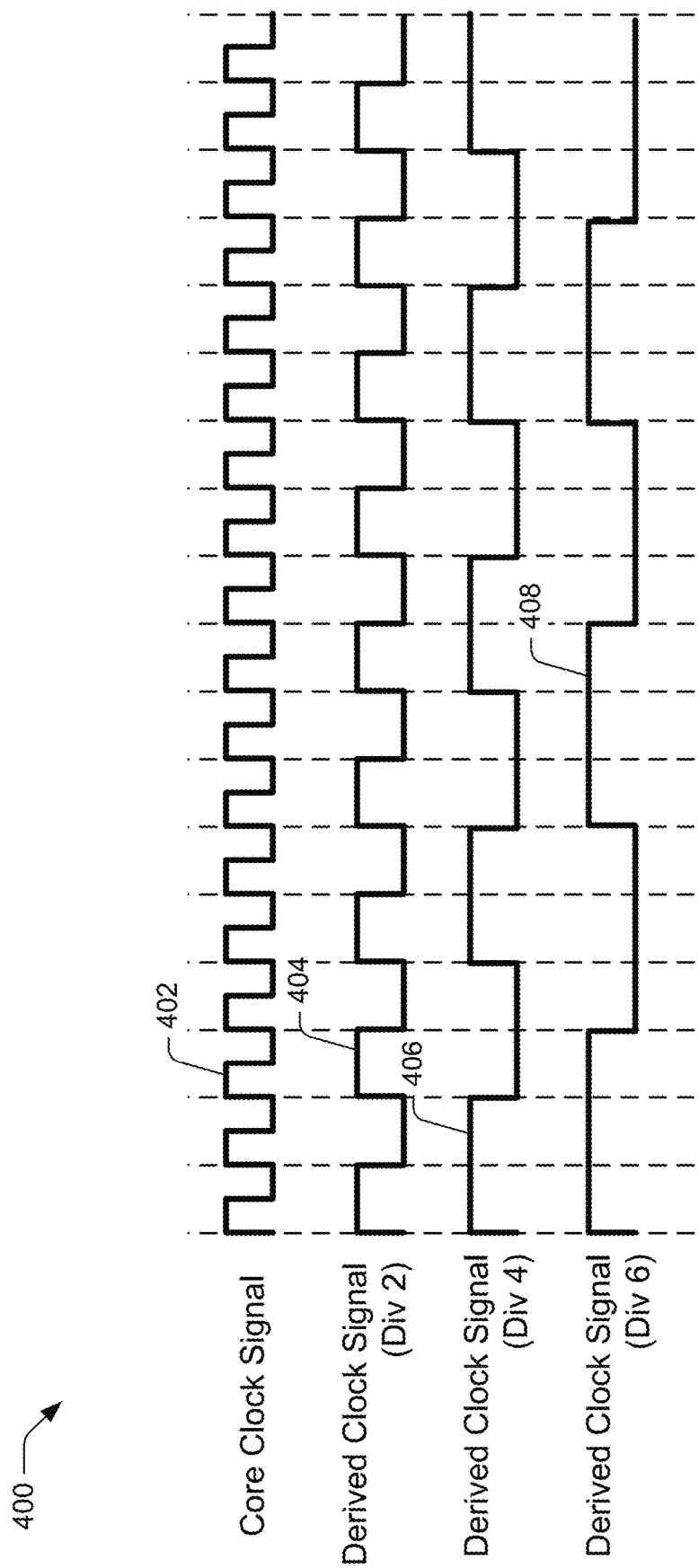
FIG. 4 illustrates an example timing diagram of clock signals for the independent clocking.

FIG. 4 illustrates an example timing diagram 400 of clock signals for the independent clocking. In this example, the SoC 202 includes similar components and signals to those shown in the SoC 202 of FIG. 3, with some additional detail for the core clock signal and derived clock signals.

Generally, the clock manager 116 can generate a core clock signal 402 with a core clock rate, such as for an IP block subsystem or IP block core. The core clock signal 402 may be similar to the core clock signal 310 illustrated in FIG. 3. The clock manager 116 can provide the core clock signal 402 to enable communication between the IP subsystems 110 of an IP block 108 and the application processor 114.

The clock manager 116 can also generate a derived clock signal 404, 406, or 408. In the depicted implementation, the derived clock signal 404, 406, or 408 has a derived clock rate that is an integer division slower than the core clock rate of the core clock signal 402. For example. the derived clock rate of the derived clock signal 404 is two times slower (e.g., division of two) than the core clock rate. The derived clock rate of the derived clock signal 406 is four times slower (e.g., division of four) than the core clock rate. And the derived clock rate of the derived clock signal 408 is six times slower (e.g., division of six) than the core clock rate. The derived clock signals 404, 406, and 408 are synchronous with the core clock signal 402, as illustrated by the alignment of their respective phases. By synchronous, it is meant that the rising edge of the derived clock signals 404, 406, and 408 coincide with a rising edge of the core clock signal 402. While the duty cycle of each of the derived clock signals 404, 406, and 408 is shown as being similar (e.g., fifty percent) to the duty cycle of the core clock signal 402, this is not necessarily true in all implementations.

Figure 5:
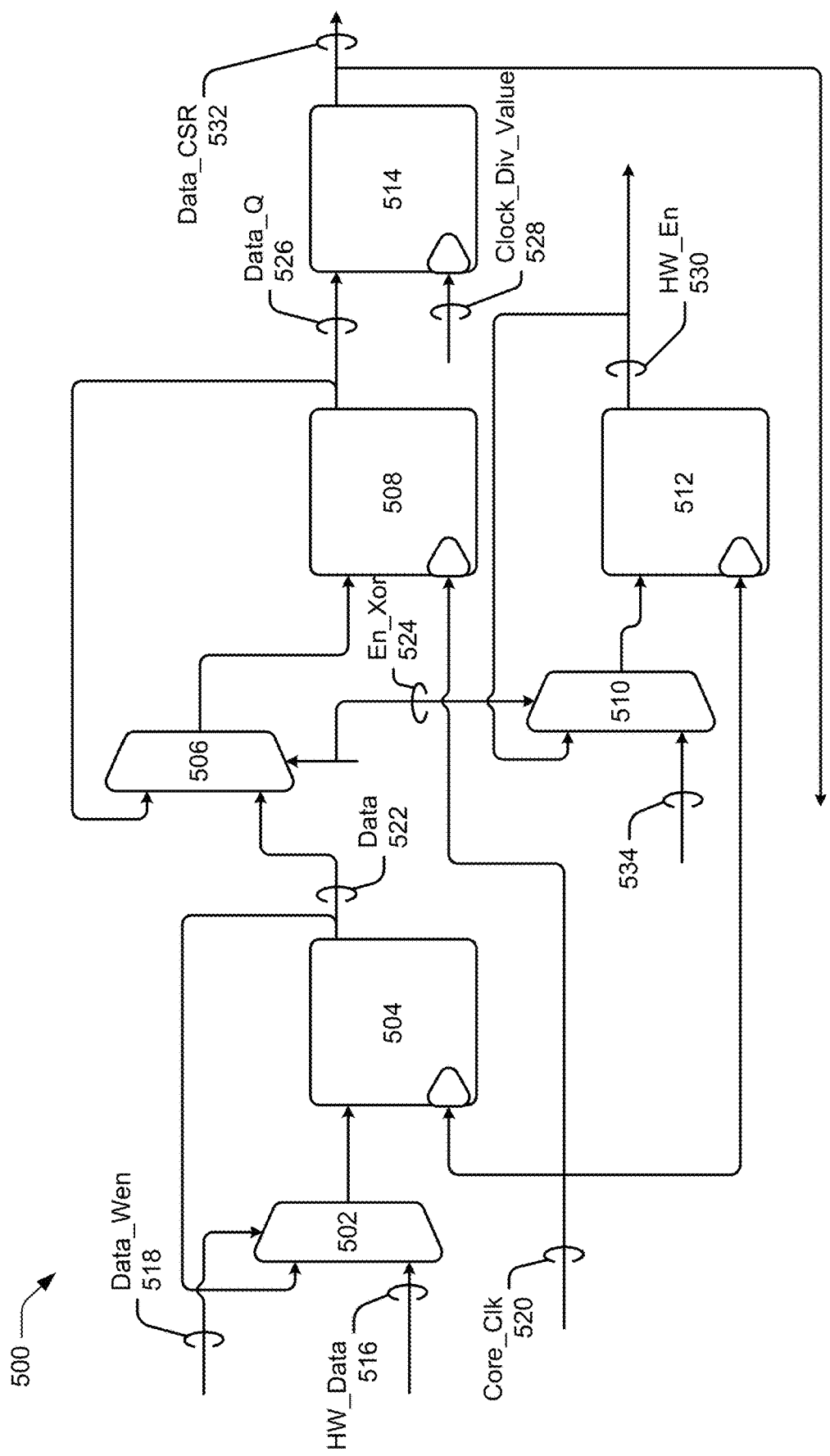
FIG. 5 illustrates an example diagram to enable the described aspects of independent clocking for CSRs for a monitoring-only attribute.

FIG. 5 illustrates an example diagram 500 to enable the described aspects of independent clocking for CSRs for a monitoring-only attribute (e.g., a read-only attribute). In this example, the SoC 202 includes similar components and signals to those shown in the SoC of FIG. 3 with some additional detail. The CSR set 112 supports a monitoring-only attribute, in which the application processor 114 has read-only operations available, and the IP subsystems 110 have read and write operations available.

The diagram 500 includes multiplexers 502, 506, and 510 and latches 504, 508. 512, and 514. The multiplexer 502 is operatively coupled to the latch 504. The inputs to the multiplexer 502 include an HW_Data signal 516 and a Data signal 522. The HW_Data signal 516 can convey, for example, a read or write command. The Data signal 522 can, for example, convey the data value associated with the write command. The selection between the HW_Data signal 516 and the Data signal 522 is directed by a data write-enable signal 518 (Data_Wen 518).

The latch 504 includes inputs of the core clock signal (Core_Clk) 520 and the output of the multiplexer 502. The output of the latch 504 is the Data signal 522 that is provided to the multiplexer 506. The multiplexer 506 is operatively coupled between the latch 504 and the latch 508. The inputs to the multiplexer 506 include the Data signal 522 and a quadrature-phase data signal (Data_Q) 526. The selection between the Data signal 522 and the Data_Q signal 526 is directed by an En_Xor 524 signal.

The latch 508 includes inputs of the core clock signal (Core_Clk) 520 and the output of the multiplexer 506. The output of the latch 508 is the Data_Q signal 526 that is provided to the multiplexer 506 and the latch 514. The multiplexer 510 is operatively coupled to the latch 512. The inputs to the multiplexer 510 include an HW_En signal 530 and the Data_Q signal 526. The selection between the HW_En signal 530 and the Data_Q signal 526 is directed by the En_Xor 524 signal.

The latch 512 includes inputs of the core clock signal (Core_Clk) 520 and the output of the multiplexer 510. The output of the latch 512 is the HW_En signal 530. And the latch 514 is operatively coupled to the latch 508. The latch 514 includes inputs of the Clock_Div_Value signal 528 (e.g., values two, three, four, five, or six) and the Data_Q signal 526. The output of the latch 514 is a Data_CSR signal 532. In aspects, use of the Clock_Div_Value signal 528 may enable independent monitoring of the CSRs by the application processor 114 and read and write operations by the IP subsystems 110 of the IP block 108 independent of the core clock signal or power state of the IP block.

Figure 6:
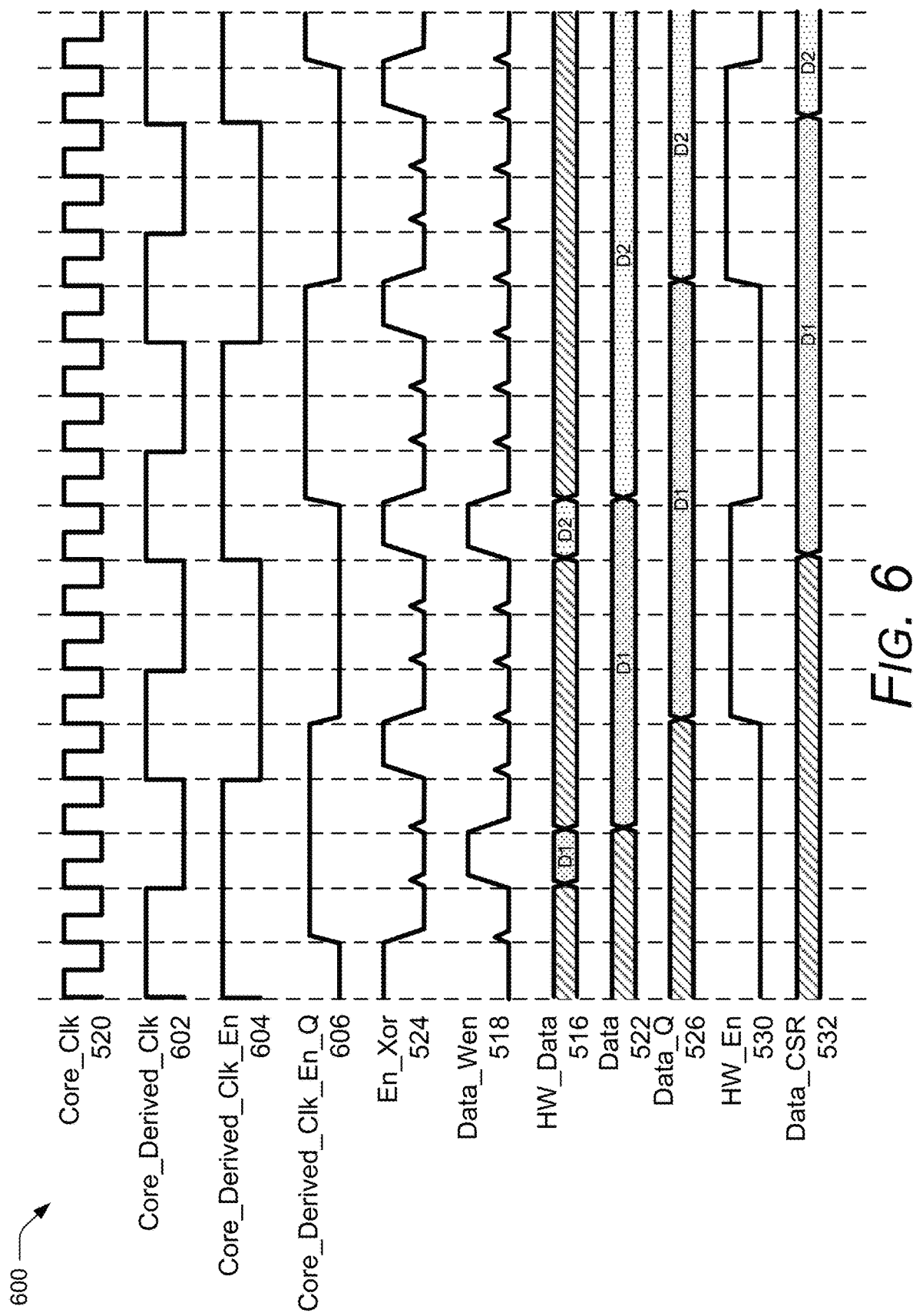
FIG. 6 illustrates an example timing diagram depicting aspects of independent clocking for CSRs for a monitoring-only attribute.

FIG. 6 illustrates an example timing diagram 600 depicting aspects of the described independent clocking for CSRs for a monitoring-only attribute. The descriptions related to FIG. 6 reference the hardware and techniques described above with respect to FIGS. 1 through 5. Nonetheless, the timing diagram 600 may be implemented with different hardware, techniques, schemes, or a combination thereof. Generally, the timing diagram 600 indicates example signaling between the IP subsystems 110 and the CSR set 112 that supports a monitoring-only attribute, in which the application processor 114 has read-only operations available, and the IP subsystems 110 have read and write operations available.

The clock manager 116 can provide the Core_Clk signal 520 to the IP block 108 to enable communication between the IP subsystems 110 and the application processor 114. The clock manager 116 can also provide the Core_Derived_Clk signal 602 to the CSR set 112 and the asynchronous bridge 302 to enable communication between the application processor 114 and the CSR set 112. The derived clock rate of the Core_Derived_Clk signal 602 is four times slower than the clock rate of the Core_Clk signal 520. The Core_Derived_Clk_En signal 604 is synchronous with a rising edge of the Core_Derived_Clk signal 602. The Core_Derived_Clk_En_Q signal 606 is ninety degrees out-of-phase with the Core_Derived_Clk_En signal 604. The En_Xor signal conveys a true or high output if either, and only one of, the Core_Derived_Clk_En signal 604 or the Core_Derived_Clk_En_Q signal 606 is high or true.

The Data_Wen signal 518 conveys true or high when the HW_Data signal 516 conveys a read or write command. The HW_Data signal indicates whether the IP subsystems include a read or write command for the CSR set 112. The Data signal 522 conveys the data associated with the read or write commands. The Data_Q signal 526 is synchronous with the Core_Derived_Clk_En_Q signal 606. The HW_En signal 530 is synchronous with the Data_Q signal 526. The Data_CSR signal 532 conveys when the values of the Data signal 522 are written to or read from the CSR set 112. In aspects, use of the Core_Derived_Clk signal 602 may enable independent monitoring of the CSRs by the application processor 114 and read and write operations by the IP subsystems 110 of the IP block 108 independent of the Core_Clk signal 520 or power state of the IP block. The slower clock rate of the Core_Derived_Clk signal 602 may also reduce the power dissipation associated with the CSR set 112.

Figure 7:
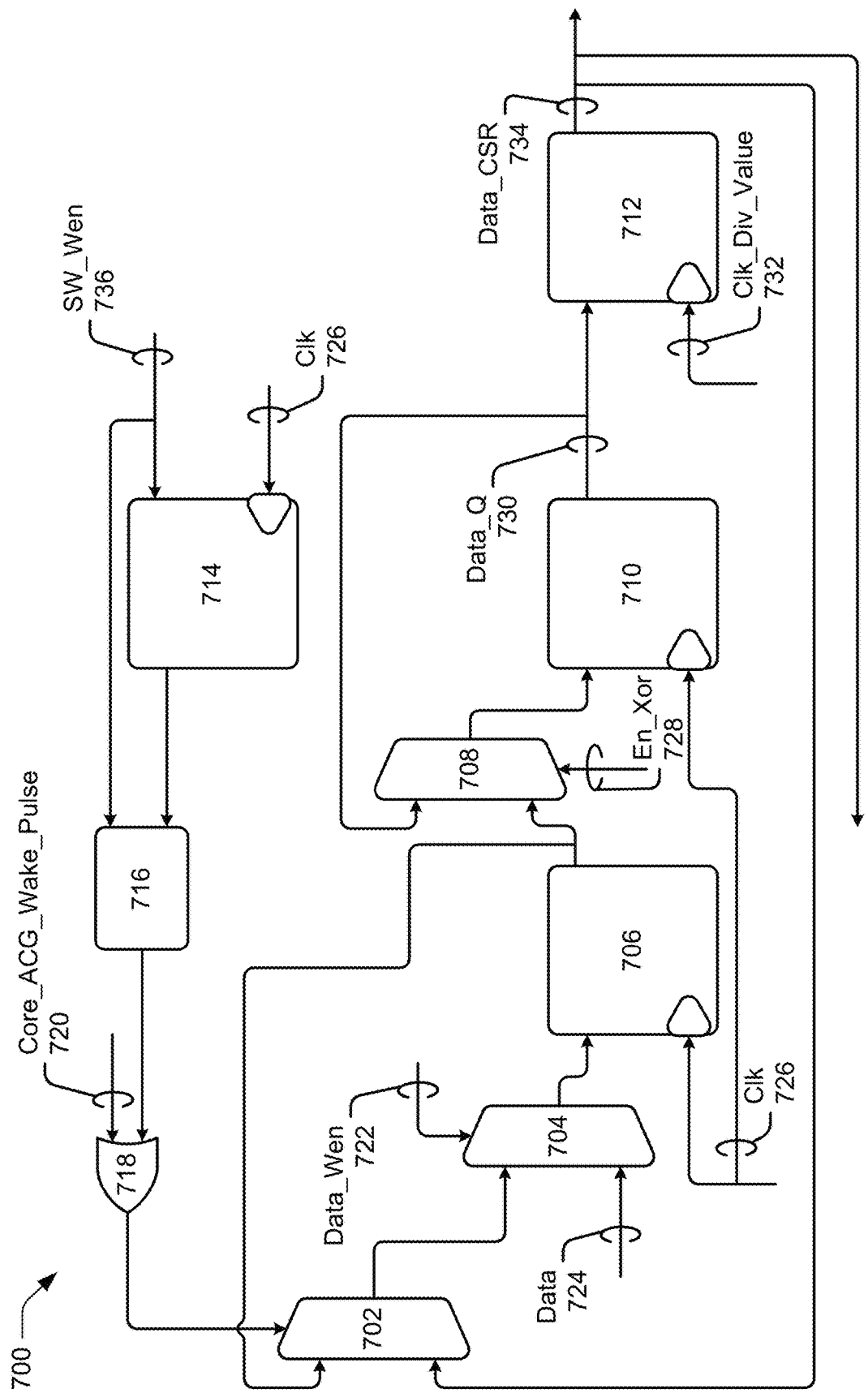
FIG. 7 illustrates an example diagram to enable the described aspects of independent clocking for CSRs for control and monitoring attributes.

FIG. 7 illustrates an example diagram 700 to enable the described aspects of independent clocking for CSRs for a control and monitoring attribute. In this example, the SoC 202 includes similar components and signals to those shown in the SoC of FIG. 3 with some additional detail. The CSR set 112 supports control and monitoring attributes, in which the application processor 114 and the IP subsystems 110 have read and write operations available.

The diagram 700 includes multiplexers 702, 704, and 708, latches 706, 710, 712, and 714, a falling edge detector 716, and an OR logic gate 718. The multiplexer 702 is operatively coupled to the multiplexer 704 and the OR logic gate 718. The inputs to the multiplexer 702 include a Data signal 724 and a Data_CSR signal 734. The Data signal 724 can convey the data value associated with a read or write command. The selection between the Data signal 724 and the Data_CSR signal 734 is directed by the output of the OR logic gate 718.

The multiplexer 704 is operatively coupled to the latch 706 and the multiplexer 702. The inputs to the multiplexer 704 include the Data signal 724 and the output of the multiplexer 702. The selection between the Data signal 724 and the output of the multiplexer 702 is directed by a Data_Wen signal 722.

The latch 706 is operatively coupled between the multiplexer 704 and the multiplexer 708. The latch 706 includes inputs of a Clk signal 726 (e.g., a core clock signal) and the output of the multiplexer 704. The output of the latch 706 is the Data signal 724.

The multiplexer 708 is operatively coupled between the latch 706 and the latch 710. The inputs to the multiplexer 708 include the Data signal 724 and a Data_Q signal 730. The selection between the Data signal 724 and the Data_Q signal 730 is directed by an En_Xor signal 728.

The latch 710 is operatively coupled between the multiplexer 708 and the latch 712. The latch 710 includes inputs of the Clk signal 726 and the output of the multiplexer 708. The output of the latch 708 is the Data_Q signal 730.

The latch 712 is operatively coupled to the latch 710 and the multiplexer 702. The latch 712 includes inputs of the Data_Q signal 730 and a Clk_Div_Value signal 732. The output of the latch 712 is the Data_CSR signal 734.

The latch 714 is operatively coupled to the falling edge detector 716. The latch 714 includes inputs of the Clk signal 726 and a SW_Wen signal 736. The output of the latch 714 is provided to the falling edge detector 716. The falling edge detector 716 is operatively coupled to the OR logic gate 718. Another input to the falling edge detector 716 is the SW_Wen signal 736. The output of the falling edge detector 716 is an input to the OR logic gate 718. Another input to the OR logic gate 718 is a Core_ACG_Wake_Pulse signal 720. In aspects, use of the Clock_Div_Value signal 732 may enable independent monitoring of the CSRs by the application processor 114 and read and write operations by both the application processor 114 and the IP subsystems 110 of the IP block 108 independent of the core clock signal or power state of the IP block 108.

Example Methods

FIG. 8 is a flowchart illustrating example operations 800 of independent clocking for CSRs. The operations 800 are described in the context of the integrated circuit 106 or the SoC 202 of FIGS. 1 through 7 or the SoC 900 of FIG. 9. The operations 800 may be performed in a different order or with additional or fewer operations.

At 802, a first clock signal is generated by a clock manager. The clock manager is operatively coupled to an asynchronous bridge, an IP block, and a CSR set. The IP block includes one or more IP subsystems and the CSR set associated with the one or more IP subsystems. The asynchronous bridge is operatively coupled between the CSR set and the application processor. For example, the clock manager 116 can generate the core clock signal 402. The clock manager 116 is operatively coupled to the asynchronous bridge 302, the IP block 108, and the CSR set 112. One or more respective clock gate controllers 204 may be operatively coupled between the clock manager 116 the asynchronous bridge 302, the IP block 108, or the CSR set 112 (e.g., the clock gate controllers 204-1, 204-2, and 204-3 of FIG. 3).

At 804, the first clock signal is provided to the IP block to enable operation of the IP block or core of the IP block, which may include communication between the one or more IP subsystems of the IP block and the application processor. For example, the clock manager 116 provides the core clock signal 402 to the IP block 108. The core clock signal 402 enables communication between the IP subsystems 110 and the application processor 114.

At 806, a second clock signal is generated. The second clock signal has a derived clock rate that is an integer division slower or an integer multiplication faster than a clock rate of the first clock signal. The second clock signal is also capable of being selectively gated independent of the first clock signal. For example, the clock manager 116 can also generate the derived clock signal 404. The derived clock signal 404 has a derived clock rate that is an integer division slower (e.g., two times slower) than the clock rate of the core clock signal 402. The derived clock rate can also be three, four, five, or six times slower than the clock rate of the core clock signal 402. In other implementations, the derived clock rate can be two, three, four, five, or six times faster than the clock rate of the core clock signal 402. The derived clock signal 404 can also be selectively gated independent of the core clock signal 402. Thus, the second clock signal may enable CSR access while the clock signal to the IP block is gated and/or the IP block is in a state of inactivity. Alternatively, the second clock signal may be gated or disabled when the CSRs are not accessed, enabled CSR-related power savings while the IP block operates to provide its respective functionality to the AP or SoC.

At 808, the second clock signal is provided to the CSR set and the asynchronous bridge to enable communication between the application processor and the CSR set at the derived clock rate. For example, the clock manager 116 can provide the derived clock signal 404 to the CSR set 112 and the asynchronous bridge 302 to enable communication between the application processor 114 and the CSR set 112 at the derived clock rate. By using the derived clock rate, the CSRs may operate at a lower frequency and/or while the IP block is inactive, enabling the SoC to conserve power while accessing the CSRs independently from a core clock of the IP block.

Example Device and System

FIG. 9 illustrates an example SoC 900 that may implement aspects of independent clocking for CSRs. The SoC 900 may be embodied as or within any type of user device 102, user equipment, apparatus, other device, or system as described with reference to FIGS. 1 through 8 to implement aspects of the independent clocking for CSRs. Although described with reference to chip-based packaging, the components illustrated in FIG. 9 may also be embodied as other systems or component configurations, such as an FPGA, ASIC, application-specific standard product (ASSP), digital signal processor (DSP), complex programmable logic device (CPLD), system-in-package (SiP), package-on-package (POP), processing and communication chip set. communication co-processor, sensor co-processor, or the like.

In this example, the SoC 900 includes one or more application processors 902 (e.g., processor cores), which process various computer-executable instructions to control the operation of the SoC 900 and to enable techniques for the described independent clocking for CSRs (e.g., the CSR set 112). Alternatively or additionally, the SoC 900 can be implemented with any one or combination of hardware, firmware, or fixed logic circuitry that is implemented in connection with processing and control circuits (not illustrated in FIG. 9). Although not shown, the SoC 900 may also include a bus, interconnect, crossbar, or fabric that couples the various components within the system.

The SoC 900 also includes a memory 904 (e.g., computer-readable storage media). such as one or more memory circuits that enable persistent or non-transitory data storage, and thus do not include transitory signals or carrier waves. Examples of the memory 904 include RAM. non-volatile memory (e.g., ROM, EPROM, EEPROM, etc.), or flash memory. The memory 904 provides data storage for system data 906, as well as for firmware 908, applications 910, and any other types of information or data related to operational aspects of the SoC 900. For example, the firmware 908 can be maintained as processor-executable instructions of an operating system (e.g., real-time OS) within the memory 904 and executed on the application processor 902.

The applications 910 may include a system manager, such as any form of a control application, software application, signal-processing and control module, code that is native to a particular system, an abstraction module or gesture module and so on. The memory 904 may also store system components or utilities for implementing aspects of the described independent clocking for CSRs.

The SoC 900 also includes a clock manager 116, clock gate controllers 204, and asynchronous bridges 302 implemented in accordance with one or more aspects of independent clocking for CSRs as described herein. Generally, the clock manager 116, clock gate controllers 204, and asynchronous bridges 302 are coupled between the application processor 902 and functional blocks of the SoC 900 to enable independent clocking of respective CSRs of components (e.g., function blocks or IP blocks) of the SoC 900. In this example, the SoC 900 also includes a variety of function blocks or processors 912 through 924, any of which may be implemented as an IP block with a corresponding IP subsystem to provide a respective described function and a CSR set accessible by the application processor 902 as described herein.

As shown in FIG. 9, the SoC 900 includes communication transceivers 912 and a wireless modem 914 that enable wired or wireless communication of the system data 906 (e.g., received data, data that is being received, data scheduled for broadcast, packetized, or the like). In some aspects, the wireless modem 914 is a multi-mode multi-band modem or baseband processor that is configurable to communicate in accordance with various communication protocols or in different frequency bands. The wireless modem 914 may include a transceiver interface (not shown) for communicating encoded or modulated signals with transceiver circuitry (e.g., the RF transceiver 104).

The SoC 900 can include one or more data inputs 916 via which any type of data. media content, or inputs can be received, such as user input, user-selectable inputs (explicit or implicit), or any other type of audio, video, or image data received from a content or data source. Alternatively or additionally, the data inputs 916 may include various data interfaces, which can be implemented as any one or more of a serial or parallel interface, a wireless interface, a network interface, and as any other type of communication interface enabling communication with other devices or systems.

The SoC 900 also includes additional processors or co-processors (e.g., the IP blocks 108 of FIGS. 1 through 8) to enable other functionalities, such as a graphics processor 918. audio processor 920, and image sensor processor 922. The graphics processor 918 may render graphical content associated with a user interface, operating system, or applications of the SoC 900. In some cases, the audio processor 920 encodes or decodes audio data and signals, such as audio signals and information associated with voice calls or encoded audio data for playback. The image sensor processor 922 may be coupled to an image sensor and provide image data processing, video capture, and other visual media conditioning and processing functions. The SoC can also include a sensor interface 924. The sensor interface 924 enables the SoC 900 to receive data from various sensors, such as capacitance and motion sensors.

EXAMPLES

In the following section, examples are provided.

Example 1: A system-on-chip (SoC) comprising: an intellectual property (IP) block including at least one IP subsystem, the one IP block including a configuration and status register (CSR) set associated with the at least one IP subsystem; an asynchronous bridge operatively coupled between the CSR set and an application processor; and a clock manager operatively coupled to the asynchronous bridge, the IP block, and the CSR set, the clock manager configured to: generate a first clock signal; provide the first clock signal to the IP block to enable communication between the at least one IP subsystem and the application processor; generate a second clock signal, the second clock signal having a derived clock rate that is an integer division slower or an integer multiplication faster than a clock rate of the first clock signal and capable of being selectively gated independent of the first clock signal; and provide the second clock signal to the CSR set and the asynchronous bridge to enable communication between the application processor and the CSR set at the derived clock rate.

Example 2: The SoC of example 1, wherein the derived clock rate is dynamically adjustable to different integer divisions or different integer multiplications of the clock rate of the first clock signal.

Example 3: The SoC of example 2, wherein: the different integer divisions are equal to at least two of two, three, four, five, or six; or the different integer multiplications are equal to at least two of two, three, four, five, or six.

Example 4: The SoC of any of examples 1 through 3, the SoC further comprising a clock gate controller operatively coupled between the clock manager and the CSR set, the clock gate controller configured to implement the selective gating of the second clock signal.

Example 5: The SoC of example 4, the SoC further comprising another clock gate controller operatively coupled between the clock manager and the at least one IP subsystem, the other clock gate controller configured to implement selective gating of the first clock signal independent of the second clock signal.

Example 6: The SoC of example 5, wherein the application processor is configured to write a configuration value to the CSR set when the first clock signal is selectively gated.

Example 7: The SoC of example 5 or 6, wherein the other clock gate controller is further configured to implement the selective gating of the first clock signal to enable an auto clock gated mode for the at least one IP subsystem.

Example 8: The SOC of any of examples 1 through 7, the SoC further comprising a retention power rail operatively coupled to the CSR set.

Example 9: The SoC of any of examples 1 through 8, wherein a performance point of the second clock signal is independent of a performance point of the first clock signal.

Example 10: The SoC of any of examples 1 through 9, wherein circuit paths that terminate at the CSR set are configured as multi-cycle paths.

Example 11: The SoC of any of examples 1 through 10, wherein the derived clock rate of the second clock signal is synchronous to the clock rate of the first clock signal.

Example 12: The SoC of any of examples 1 through 11, the SoC further comprising: multiple IP blocks, each of the multiple IP blocks including respective IP subsystems and a respective CSR set associated with the IP subsystems; multiple respective asynchronous bridges, each of the multiple respective asynchronous bridges operatively coupled between the application processor and the respective CSR set; and multiple respective clock managers, each of the multiple respective clock managers operatively coupled to the respective asynchronous bridge, the respective IP block, and the respective CSR set.

Example 13: The SoC of any of examples 1 through 12, wherein: the SoC is included in a user device; and the IP block is a processor or co-processor of the SoC that enables functionalities of the user device.

Example 14: The SoC of example 13, wherein the user device comprises a mobile phone, a tablet device, a laptop computer, a desktop computer, a computerized watch, a wearable computer, or a voice-assistant system.

Example 15: A method comprising: generating, by a clock manager operatively coupled to an asynchronous bridge, an intellectual property (IP) block, and a configuration and status register set, a first clock signal, the IP block including at least one IP subsystem and the CSR set associated with the at least one IP subsystem, the asynchronous bridge operatively coupled between the CSR set and an application processor; providing the first clock signal to the IP block to enable communication between the at least one IP subsystem and the application processor; generating a second clock signal, the second clock signal having a derived clock rate that is an integer division slower or an integer multiplication faster than a clock rate of the first clock signal and capable of being selectively gated independent of the first clock signal; and providing the second clock signal to the CSR set and the asynchronous bridge to enable communication between the application processor and the CSR set at the derived clock rate.

CONCLUSION

While various apparatuses, configurations, and methods for independent clocking for CSRs have been described in language specific to features and/or methods, it is to be understood that the subject of the appended claims is not necessarily limited to the specific features or methods described. Rather, the specific features and methods are disclosed as non-limiting examples of independent clocking for CSRs.

What is claimed is:

1. A system-on-chip (SoC) comprising:
an intellectual property (IP) block including at least one IP subsystem, the one IP block including a configuration and status register (CSR) set associated with the at least one IP subsystem;
an asynchronous bridge operatively coupled between the CSR set and an application processor; and
a clock manager operatively coupled to the asynchronous bridge, the IP block, and the CSR set, the clock manager configured to:
generate a first clock signal;
provide the first clock signal to the IP block to enable communication between the at least one IP subsystem and the application processor;
generate a second clock signal, the second clock signal having a derived clock rate that is an integer division slower or an integer multiplication faster than a clock rate of the first clock signal and capable of being selectively gated independent of the first clock signal; and
provide the second clock signal to the CSR set and the asynchronous bridge to enable communication between the application processor and the CSR set at the derived clock rate.

2. The SoC of claim 1, wherein the derived clock rate is dynamically adjustable to different integer divisions or different integer multiplications of the clock rate of the first clock signal.

3. The SoC of claim 1, the SoC further comprising a clock gate controller operatively coupled between the clock manager and the CSR set, the clock gate controller configured to implement the selective gating of the second clock signal.

4. The SoC of claim 1, the SoC further comprising a retention power rail operatively coupled to the CSR set.

5. The SoC of claim 1, wherein a performance point of the second clock signal is independent of a performance point of the first clock signal.

6. The SoC of claim 1, wherein circuit paths that terminate at the CSR set are configured as multi-cycle paths.

7. The SoC of claim 1, wherein the derived clock rate of the second clock signal is synchronous to the clock rate of the first clock signal.

8. The SoC of claim 1, the SoC further comprising:
multiple IP blocks, each of the multiple IP blocks including respective IP subsystems and a respective CSR set associated with the IP subsystems;
multiple respective asynchronous bridges, each of the multiple respective asynchronous bridges operatively coupled between the application processor and the respective CSR set; and
multiple respective clock managers, each of the multiple respective clock managers operatively coupled to the respective asynchronous bridge, the respective IP block, and the respective CSR set.

9. The SoC of claim 1, wherein:
the SoC is included in a user device; and
the IP block is a processor or co-processor of the SoC that enables functionalities of the user device.

10. The SoC of claim 2, wherein:
the different integer divisions are equal to at least two of two, three, four, five, or six; or
the different integer multiplications are equal to at least two of two, three, four, five, or six.

11. The SoC of claim 3, the SoC further comprising another clock gate controller operatively coupled between the clock manager and the at least one IP subsystem, the other clock gate controller configured to implement selective gating of the first clock signal independent of the second clock signal.

12. The SoC of claim 11, wherein the application processor is configured to write a configuration value to the CSR set when the first clock signal is selectively gated.

13. The SoC of claim 11, wherein the other clock gate controller is further configured to implement the selective gating of the first clock signal to enable an auto clock gated mode for the at least one IP subsystem.

14. The SoC of claim 9, wherein the user device comprises a mobile phone, a tablet device, a laptop computer, a desktop computer, a computerized watch, a wearable computer, or a voice-assistant system.

15. A method comprising:
generating, by a clock manager operatively coupled to an asynchronous bridge, an intellectual property (IP) block, and a configuration and status register (CSR) set, a first clock signal, the IP block including at least one IP subsystem and the CSR set associated with the at least one IP subsystem, the asynchronous bridge operatively coupled between the CSR set and an application processor;

providing the first clock signal to the IP block to enable communication between the at least one IP subsystem and the application processor;

generating a second clock signal, the second clock signal having a derived clock rate that is an integer division slower or an integer multiplication faster than a clock rate of the first clock signal and capable of being selectively gated independent of the first clock signal; and providing the second clock signal to the CSR set and the asynchronous bridge to enable communication between the application processor and the CSR set at the derived clock rate.

16. The method of claim 15, wherein the derived clock rate is dynamically adjustable to different integer divisions or different integer multiplications of the clock rate of the first clock signal.

17. The method of claim 15, further comprising selectively gating the second clock signal via a clock gate controller operatively coupled between the clock manager and the CSR set.

18. The method of claim 16, wherein:
the different integer divisions are equal to at least two of two, three, four, five, or six; or
the different integer multiplications are equal to at least two of two, three, four, five, or six.

19. The method of claim 17, further comprising selectively gating the first clock signal via another clock gate controller operatively coupled between the clock manager and the at least one IP subsystem, the selective gating of the first clock signal being independent of the selective gating of the second clock signal.

20. The method of claim 19, further comprising writing a configuration value to the CSR set while the first clock signal is selectively gated.

* * * * *